L. G. HANDY.
WHEEL.
APPLICATION FILED JUNE 4, 1910.
1,013,996.
Patented Jan. 9, 1912.
2 SHEETS—SHEET 1.
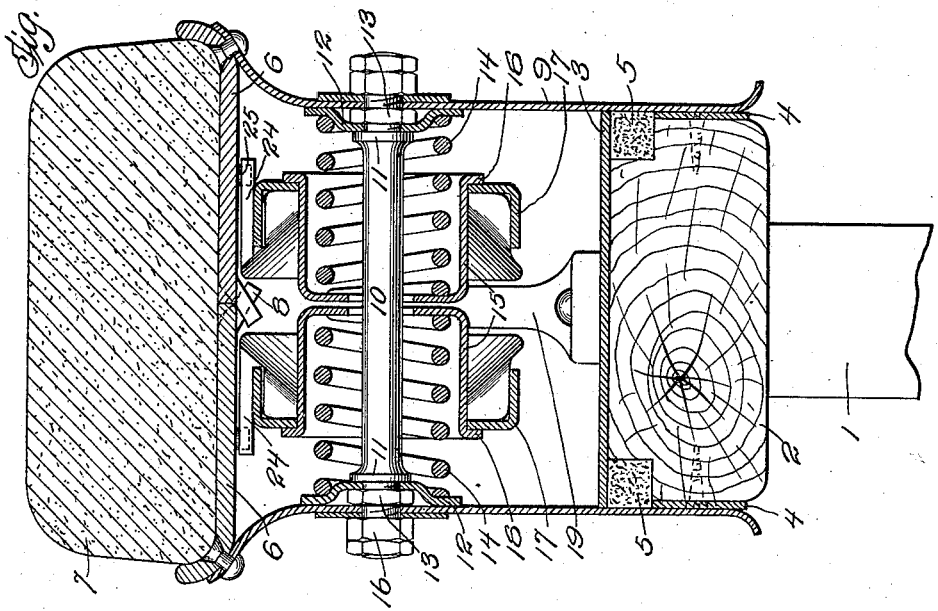
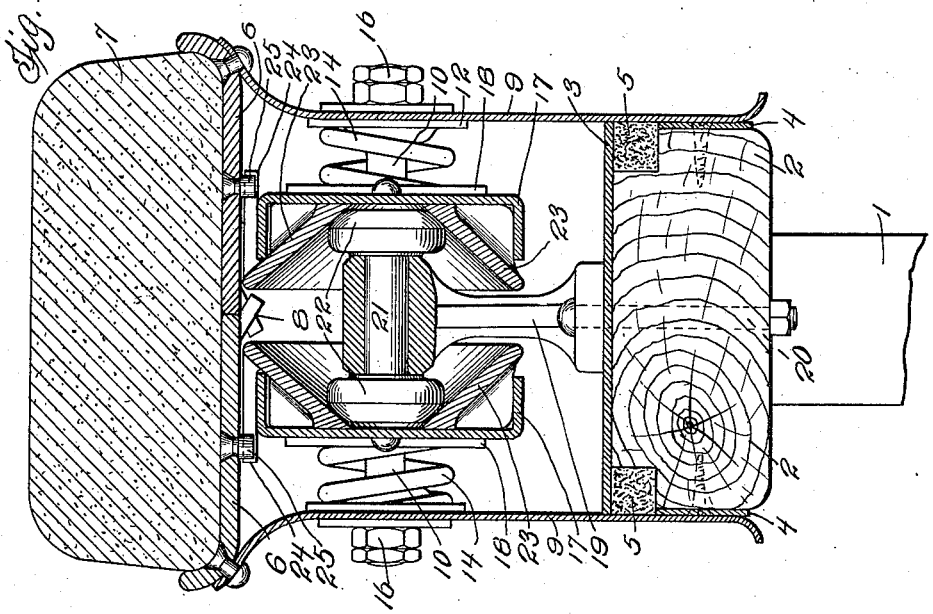
Witnesses:
P. G. Kolle
Edgar M. Kitchin
Inventor
L. G. Handy
By his Attorney
F. H. Gibbs

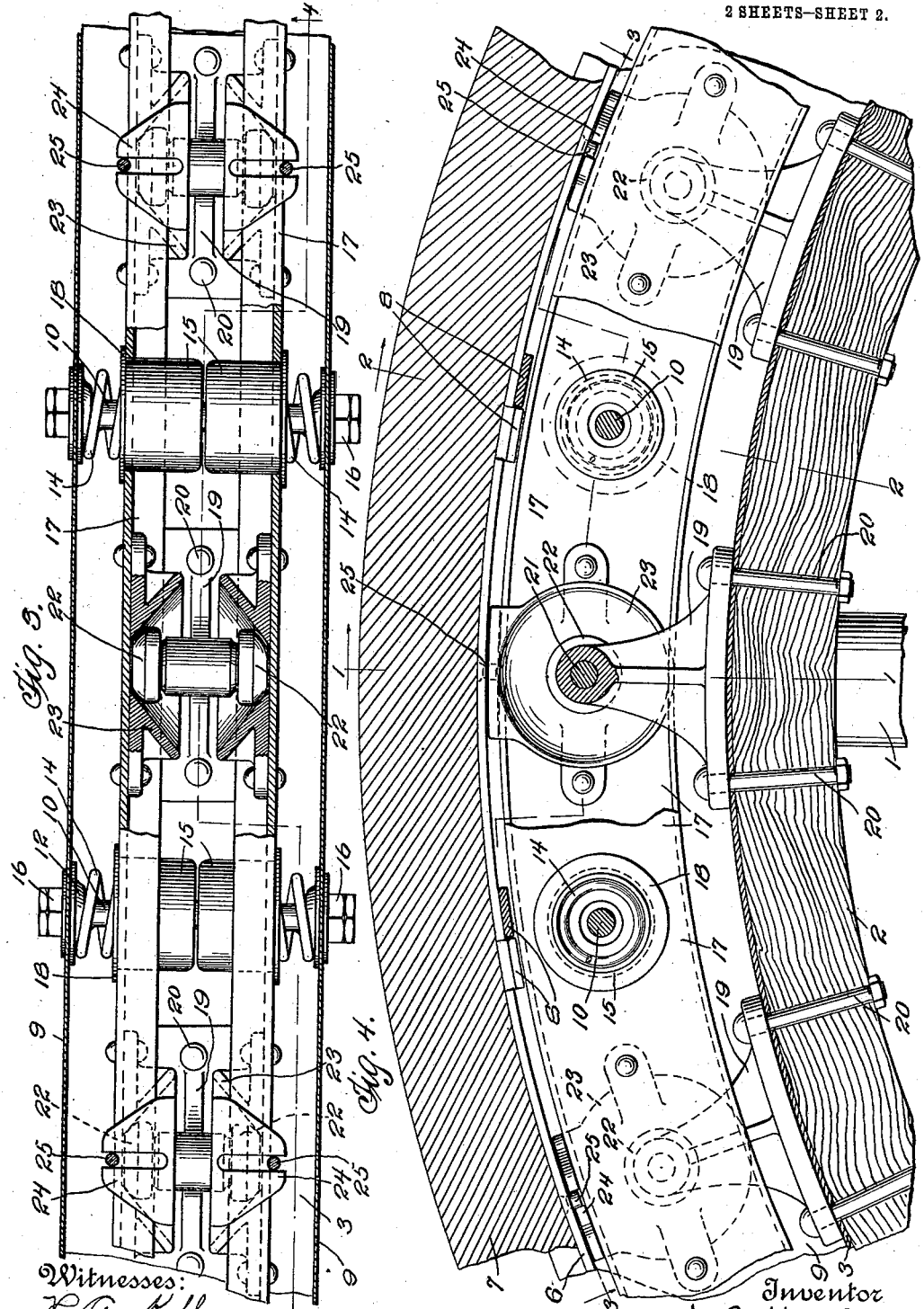

UNITED STATES PATENT OFFICE.

LEVIN GESSFORD HANDY, OF RUTHERFORD, NEW JERSEY, ASSIGNOR TO WILLIAM C. DICKERMAN, OF NEW YORK, N. Y.

WHEEL.

1,013,996.  Specification of Letters Patent.  Patented Jan. 9, 1912.

Application filed June 4, 1910. Serial No. 565,065.

*To all whom it may concern:*

Be it known that I, LEVIN GESSFORD HANDY, residing at Rutherford, New Jersey, and being a citizen of the United States, have invented certain new and useful Improvements in Wheels, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a transverse, vertical section taken through a fragment of a wheel embodying the features of the invention, the section being taken on the plane indicated by line 1—1 of Fig. 4. Fig. 2 is a similar section taken on the plane indicated by line 2—2 of Fig. 4. Fig. 3 is a circumferential section taken on the plane indicated by line 3—3 of Fig. 4. Fig. 4 is a vertical section taken approximately on the plane indicated by line 4—4 of Fig. 3.

Referring to the drawings by numerals, 1 are the spokes, 2 the felly, and 3 the fixed rim of a wheel body of any suitable type which elements, with the hub not illustrated, constitute the wheel body. The sides of felly 2 are flattened and provided with annular wearing plates 4—4, the outer circumferential corners of the felly being rabbeted, as at 5—5, and filled with suitable packing. A detachable rim surrounds the wheel body and is comprised of a pair of rings or bands 6, flanged at their outer annular edges for retaining a muffling tire 7, and having their inner edges meeting, and braced by underlapping extensions or lugs 8—8 arranged in pairs about the rim, and each pair comprising a lug extending from each band 6 beneath the other band. Annular guide plates 9 are fixed to the detachable rim, the outer edge of each of said plates 9 being fixed to the outer portion of the respective band 6, and said bands being rigidly connected together by means of bolts 10—10 connecting said plates 9. Each bolt 10 is formed near each end with an annular shoulder 11 abutting against a washer 12, each end of bolt 10 having a threaded reduced portion extending outwardly beyond each shoulder 11 through the washer 12, and through the contiguous guide plate 9. A nut 13 is threaded on to the threaded portion at each end of each bolt 10 into engagement with the washer 12, and engages the inner face of the respective plate 9. Two springs 14 are coiled about each bolt 10, having their inner ends disposed contiguous to each other but out of contact. The inner end of each of said springs rests against the base of a sleeve-like cup 15, which surrounds bolt 10 and the outer ends of the springs engage the respective washers 12. Thus the constant pressure of springs 14 is in a direction to force the cups 15 toward each other. The projecting parts of the reduced threaded portions of each bolt 10 which extend beyond the respective guide plates 9 are engaged by retaining nuts 16 which may be locked in position by any suitable locking means. Disposed between the fixed rim and the detachable rim are circumferentially arranged channel rings 17, each extending past all of the bolts 10 and being apertured for receiving the said bolts and parts connected thereto, the cups 15 extending through the rings, and each being formed with an outwardly disposed annular flange 18 resting against and fixed to the respective outer flat face of the given ring 17, and transmitting to the ring the inwardly exerted spring pressure of the respective spring 14. Thus the rings 17 are subjected to a constant pressure tending to force the same toward each other, that is toward the circumferential median line of the wheel body, on either side of which the rings are disposed.

Spaced preferably at uniform intervals about the circumference of the wheel body are arranged radially extending brackets or standards 19, each having its base secured to the wheel body, as by bolts 20—20, engaging such base and passed through the fixed rim and felly, and secured by nuts at their inner ends. Each bracket 19 extends outwardly between the inner edges of the inturned flanges of channel rings 17, and is formed into a sleeve bearing for a stub shaft or journal 21 revolubly mounted therein. To each end of the shaft 21 is fixed an outwardly facing truncated cone 22. Each ring 17, at the point of each bracket 19, is formed with an inwardly opening cup 23 disposed for inclosing the respective cone 22 so that in operation a resilient support is provided for the wheel body in the action of the cones against the cups which advance and recede under the pressure of springs 14, relative to the load and shocks being sustained, the rings 17 moving laterally outwardly for allowing the cones to ride out the inclined walls of the respective cups. This lateral shifting of the ring 17 is controlled and prevented from becoming torsional by means of guides which preferably assume the form of slotted, laterally projecting ears 24 on the cups 23, the slot of each being engaged by a retaining lug or pin 25 projecting inwardly from the detachable rim. Each ear 24 may be formed in any suitable way, but is preferably constructed to lie parallel with the contiguous inner surface of the detachable rim. The cups 23 with their ears 24 may be cast or otherwise formed separately from and riveted or otherwise suitably secured to the rings 17.

In operation, the stress of the load sustained by the wheel body is transmitted from the periphery of the wheel body through the brackets 19 to the cone 22, cups 23, ears 24, lugs 25, and to the detachable rim. The tendency of the cones to spread the cups apart under the weight of the load will be resisted by the springs 14 through their connections with rings 17. Of course the shocks and jars incident to the variations of the road-way are taken up by the detachable rim and transmitted conversely, the damping action of the frictional contact of the cones and cups insuring against too free or excessive resiliency in the action of the detachable rim with respect to the wheel body.

What I claim is:

1. In a wheel, a wheel body, a rim therefor, a pair of oppositely facing rigidly connected cones having a journaled engagement with the wheel body intermediate their faces, and means of resilient and frictional engagement for the cones on opposite sides thereof with the rim.

2. In a wheel, a wheel body, a rim therefor, oppositely facing cups having engagement with one of the first two mentioned elements, and bearing members frictionally engaging said cups and connected together and having means of journaled connection with the other of the first two mentioned elements, such means of connection engaging the bearing members intermediate their points of frictional contact with the cups.

3. In a wheel, a wheel body, a rim therefor, shiftable relative thereto, sets of cones, each having a journaled connection to one of the two first mentioned elements, a pair of cups for each set of cones engaging the outer faces thereof, spring pressure means for forcing said cups toward each other against the cones, and means of engagement between the cups and the other of the first two mentioned elements.

4. In a wheel, a wheel body, a rim therefor, a circumferentially disposed ring having marginal flanges, frictional means of engagement between one side of the ring and wheel body, and resilient means of engagement between the other side of the ring and the rim, said frictional means of engagement including cups partly embraced by the marginal flanges.

5. In a wheel, a wheel body, a rim therefor, circumferentially disposed, rings between the rim and wheel body, brackets extending from the wheel body and between the rings, a shaft journaled in each of the brackets, frictional contacting means between the shafts and rings adapted to exert pressure tending to shift the rings laterally, and resilient connections between the rings and rim.

6. In a wheel, a wheel body, a rim therefor, circumferentially disposed rings between the wheel body and rim, brackets extending from the wheel body and between the rings, a shaft journaled in each of the brackets, a cone at each end of each shaft, cups carried by the rings inclosing said cones, and resilient connections between the rings and rim.

7. In a wheel, a wheel body, a rim therefor, guide plates extending from the rim into sliding engagement with the wheel body, a circumferentially disposed ring formed with spaced apertures, cups engaging the ring at one side and extending through the apertures therein, springs mounted in the cups, bolts fixed to the guide plates and extending through the cups and sustaining the rings, and means of frictional engagement between the ring and the wheel body.

8. In a wheel, a wheel body, a rim therefor, a circumferentially disposed ring between the rim and wheel body, laterally acting resilient connection between the ring and rim, frictional means of engagement between the ring and wheel body, and means extending radially from the ring for guiding lateral shifting of the ring.

9. In a wheel, a wheel body, a rim therefor, a circumferentially disposed ring between the rim and wheel body, cups extending from the ring, friction means connected to the wheel body and engaging said cups, resilient means connecting the ring to the rim, a laterally extending slotted ear projecting from each of said cups, and a guiding lug for each ear extending from the rim into the slot of the respective ear.

10. In a wheel, a wheel body, a rim therefor, a circumferentially disposed annulus including oppositely disposed rigid rings, said annulus being located between said rim and said wheel body, side plates mounted upon said rim, spring members intermediate said side plates and said rigid rings, friction members between said rigid rings, and means mounted upon said wheel body for carrying said friction members.

11. In a wheel, a wheel body, a rim therefor, a pair of circumferentially disposed rigid rings between the wheel body and the rim, side plates connected to said rim, resilient means between said side plates and said rings, outstanding brackets mounted upon said wheel body, and friction means in engagement with said rings and carried by said brackets.

12. In a wheel, a wheel body, a rim therefor, a circumferentially disposed channel ring, coöperating friction members in operative relation to said ring, resilient means bearing upon said ring and adapted to exert pressure upon said friction members, and bracket members carried upon said wheel body and sustaining said friction members.

13. In a wheel, a wheel body, a rim therefor, circumferentially disposed rings having marginal flanges, friction means interposed between said marginal flanges, resilient means tending to force said marginal flanges together, a supporting member intermediate said friction means and adapted to sustain the pressure from said resilient means, and a connector between said supporting member and said wheel body.

14. In a wheel, a wheel body, a rim therefor, guide plates extending inwardly from said rim in sliding engagement with said wheel body, a pair of rings intermediate said rim and said wheel body, spring members between said guide plates and said rings, said spring members being arranged in oppositely disposed pairs and tending to thrust said rings together, friction members intermediate said rings and arranged to sustain the pressure of said opposite springs, and connectors between said friction members and said wheel body.

15. A device of the character described including a wheel body, a rim therefor, a floating ring carried between said rim and said wheel body, said floating ring comprising two annular sections oppositely disposed, means tending to force said sections together, said means being connected to the rim, means for holding said sections separated, and connectors between said last mentioned means and said wheel body.

16. In a wheel, a wheel body, a rim therefor, said rim comprising two circumferential members formed of sheet metal, said members being provided on their inner edges with inwardly inclined lugs which form positioning members for the contacting edges of said members, means for holding the inner edges of said members together, and means for attaching said rim to said wheel body.

In witness whereof I have hereunto set my hand in the presence of two witnesses.

LEVIN GESSFORD HANDY.

Witnesses:
EDGAR M. KITCHIN,
FRANK V. COOPER.

Copies of this patent may be obtained for five cents each, by addressing the "Commissioner of Patents, Washington, D. C."